United States Patent
McGuire

(10) Patent No.: US 9,415,652 B2
(45) Date of Patent: Aug. 16, 2016

(54) AXLE LIFT SYSTEM

(71) Applicant: Robert J McGuire, Ocala, FL (US)

(72) Inventor: Robert J McGuire, Ocala, FL (US)

( * ) Notice: Subject to any disclaimer, the term of this patent is extended or adjusted under 35 U.S.C. 154(b) by 208 days.

(21) Appl. No.: 14/329,966

(22) Filed: Jul. 13, 2014

(65) Prior Publication Data

US 2015/0014951 A1    Jan. 15, 2015

Related U.S. Application Data

(60) Provisional application No. 61/846,040, filed on Jul. 14, 2013.

(51) Int. Cl.
| | |
|---|---|
| *B62D 61/12* | (2006.01) |
| *B60G 17/015* | (2006.01) |
| *B60G 11/04* | (2006.01) |
| *B60G 17/005* | (2006.01) |

(52) U.S. Cl.
CPC .............. *B60G 11/04* (2013.01); *B60G 17/005* (2013.01); *B62D 61/125* (2013.01); *B60G 2202/112* (2013.01); *B60G 2204/47* (2013.01); *B60G 2400/52* (2013.01); *B60G 2600/042* (2013.01); *B60G 2600/044* (2013.01); *B60G 2600/20* (2013.01); *B60G 2800/984* (2013.01)

(58) Field of Classification Search
CPC ................. B60G 11/04; B60G 17/005; B60G 2600/044; B60G 2202/112; B60G 2600/042; B60G 2600/20; B60G 2800/984; B60G 2400/52; B60G 2204/47; B62D 61/125
See application file for complete search history.

(56) References Cited

U.S. PATENT DOCUMENTS

| | | | | |
|---|---|---|---|---|
| 2,542,795 | A | * | 2/1951 | Clement .................... B60P 1/14 280/401 |
| 2,698,758 | A | * | 1/1955 | Ronning ................ B60G 5/053 280/407.1 |
| 2,788,908 | A | | 4/1957 | Lynd |
| 3,285,621 | A | | 11/1966 | Turner, Jr |
| 3,831,210 | A | | 8/1974 | Ow |
| 3,935,606 | A | | 2/1976 | Soot |
| 4,102,424 | A | | 7/1978 | Heinze |
| 4,171,830 | A | | 10/1979 | Metz |
| 4,274,795 | A | | 6/1981 | Taylor |
| 4,842,302 | A | | 6/1989 | Lauronen et al. |
| 5,090,495 | A | | 2/1992 | Christenson |
| 5,390,945 | A | | 2/1995 | Orr |
| 5,863,049 | A | | 1/1999 | Mahvi |
| 6,213,491 | B1 | | 4/2001 | Southard, Jr. |
| 6,364,340 | B1 | | 4/2002 | Taylor |
| 6,863,490 | B2 | * | 3/2005 | Godbersen ........... B62D 63/062 414/482 |
| 8,935,054 | B2 | * | 1/2015 | Mantini ............... B60G 17/019 280/81.6 |
| 9,248,707 | B2 | * | 2/2016 | Zhou ..................... B60C 23/003 |
| 2008/0051960 | A1 | * | 2/2008 | Sokoll .................. B60G 17/016 701/41 |
| 2015/0298519 | A1 | * | 10/2015 | Iliuta ...................... B60P 1/027 280/6.151 |

FOREIGN PATENT DOCUMENTS

EP          0431673          11/1990

* cited by examiner

*Primary Examiner* — Joseph Rocca
*Assistant Examiner* — Joselynn Y Sliteris
(74) *Attorney, Agent, or Firm* — Law Office of Steven R. Olsen, PLLC; Steven R. Olsen

(57) ABSTRACT

An axle lift system for a trailer may include: a moving block coupled to an axle of the trailer; a fixed block coupled to a frame of the trailer; a winch; and a cable, the cable communicating with the moving block, the fixed block, and the winch, the axle lift system configured to move the axle upon operation of the winch. In the event of a flat (or excessively low-pressure) tire, the operator can quickly and easily activate the axle lift system to raise an axle associated with the flat tire off the ground.

19 Claims, 6 Drawing Sheets

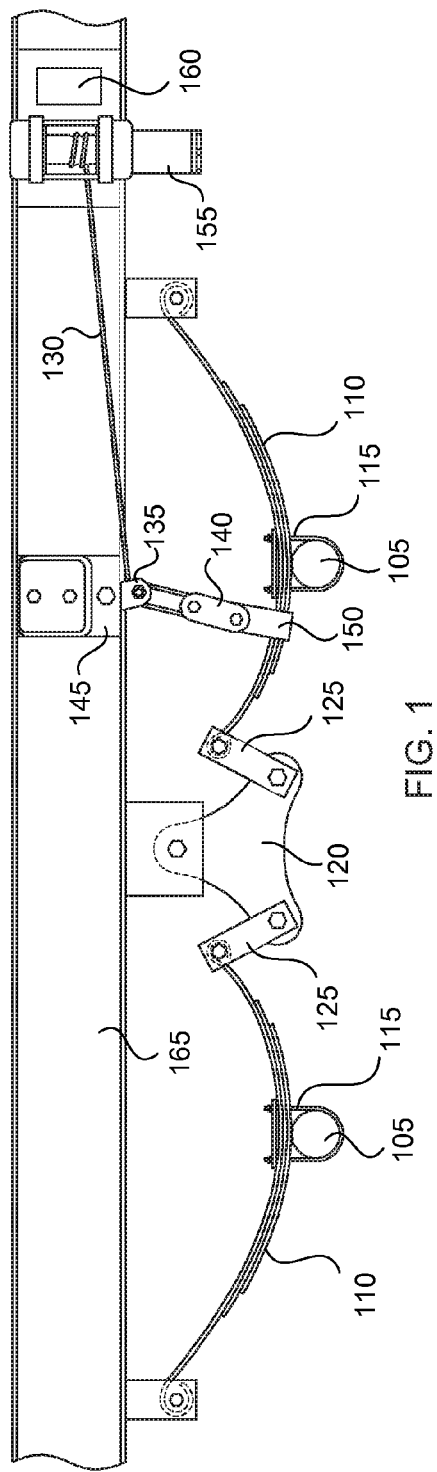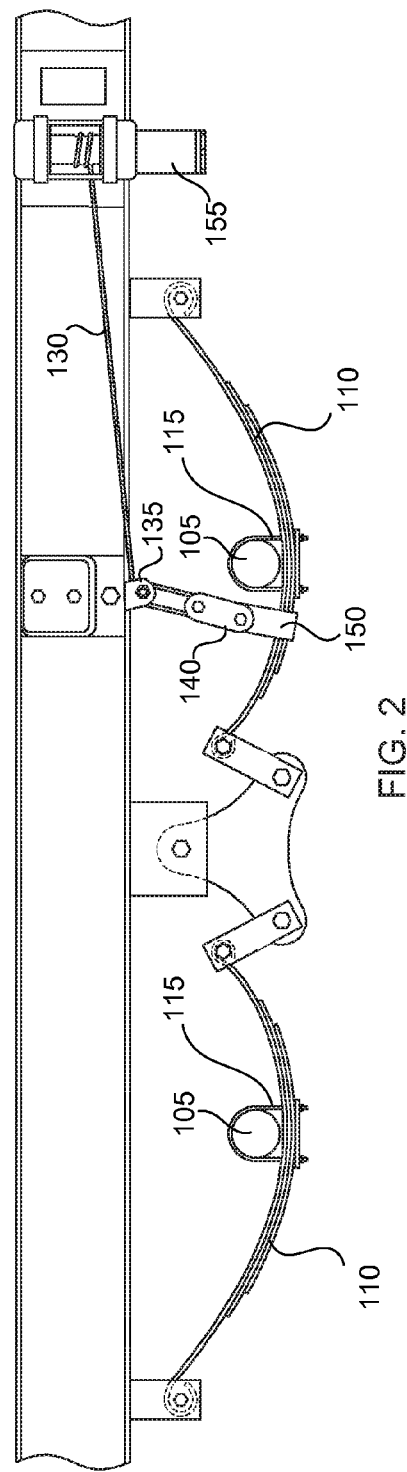

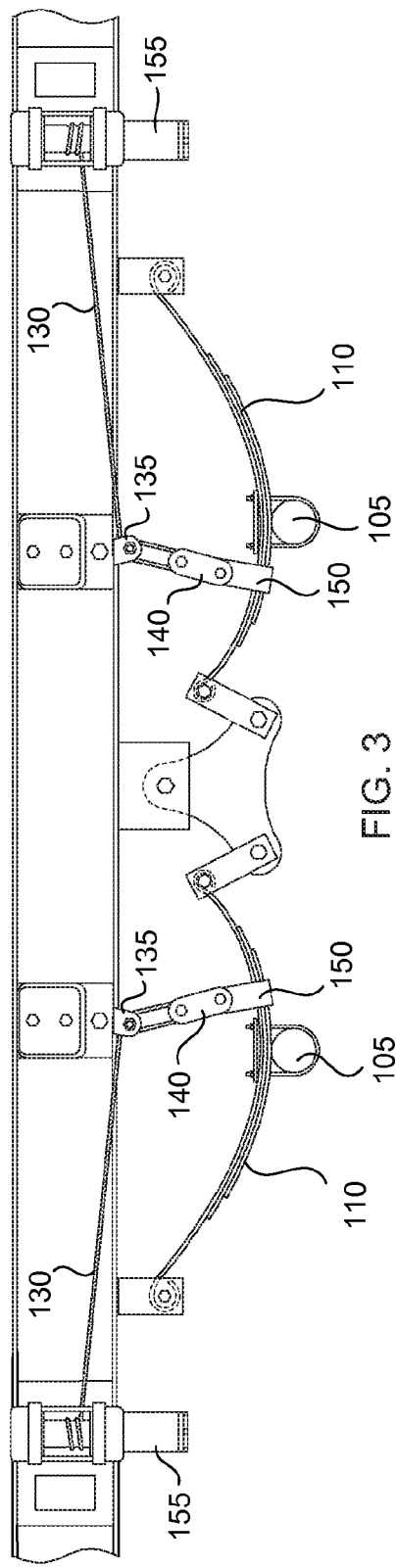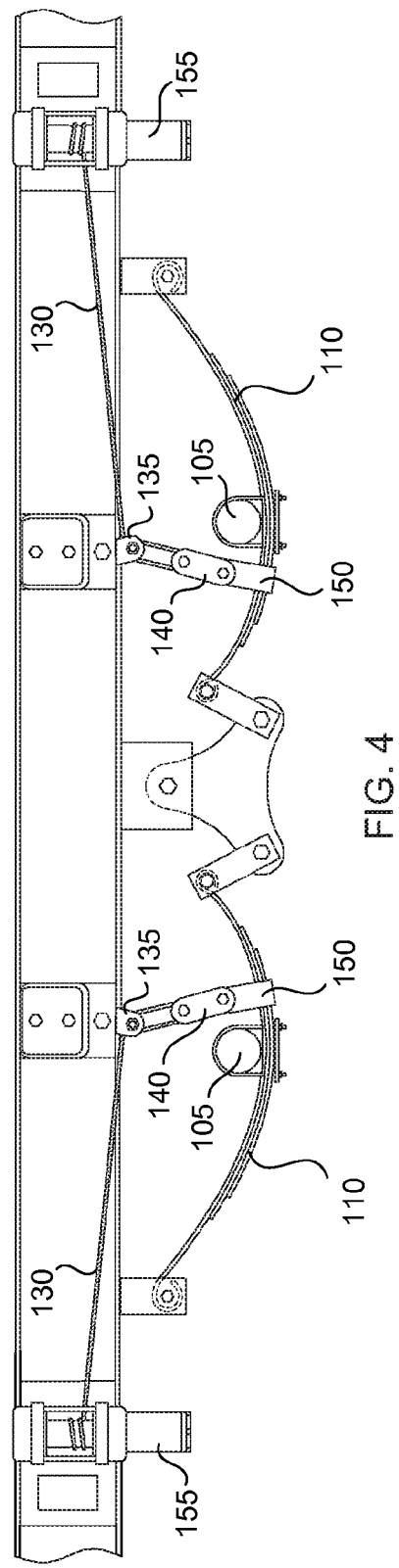

AXLE LIFT SYSTEM

CROSS REFERENCE TO RELATED APPLICATIONS

This application claims of the benefit of U.S. Provisional Application No. 61/846,040, filed Jul. 14, 2013.

BACKGROUND

1. Field of the Invention

The invention relates generally to an axle lift system for a wheeled vehicle, and more particularly, but without limitation, to an axle lift system that is configured for emergency use with multi-axle trailers.

2. Description of the Related Art

Camping trailers, boat trailers, and the like are in widespread use. Multi-axle variants are common on recreational and other types of trailers. One risk in towing such vehicles is the potential for a flat tire caused, for example, by a puncture. Continuing to drive with a flat tire is not preferable due to the potential for damage to the trailer and wheel. Accordingly, the conventional method for responding to a flat tire is to raise the axle (typically with a manually-operated scissor or hydraulic service jack), and then replace the wheel having the flat tire with a spare wheel and tire. This conventional approach has many shortcomings, however. For example, the operator may not be carrying a spare tire. And even if a suitable jack and spare tire are available, attempting such a procedure on the side of a road may be difficult, time consuming, and/or unsafe.

A more suitable apparatus and method is needed for responding to a flat tire, esp. for emergency use with a multi-axle trailer.

SUMMARY OF THE INVENTION

Embodiments of the invention seek to overcome one or more of the aforementioned limitations by providing an electrically-activated axle lift system that is preferably permanently affixed to each end of each axle of a multi-axle trailer. In the event of a flat (or excessively low-pressure) tire, the operator can quickly and easily activate the axle lift system to raise an axle associated with the flat tire off the ground. Such a system enables a more rapid tire change. Alternatively, the operator may be able to tow the trailer to a service center or at least a safer location (at an appropriate speed) with the tire in a raised state.

In an embodiment of the invention, an axle lift system for a trailer includes: a moving block coupled to an axle of the trailer; a fixed block coupled to a frame of the trailer; a winch; and a cable, the cable communicating with the moving block, the fixed block, and the winch, the axle lift system configured to move the axle upon operation of the winch.

BRIEF DESCRIPTION OF THE DRAWINGS

The invention will be more fully understood from the detailed description below and the accompanying drawings, wherein:

FIG. 1 is an elevation view of an axle lift system installed on a trailer frame, according to an embodiment of the invention;

FIG. 2 is an elevation view of an axle lift system installed on a trailer frame, according to an embodiment of the invention;

FIG. 3 is an elevation view of two axle lift systems installed on a trailer frame, according to an embodiment of the invention;

FIG. 4 is an elevation view of two axle lift systems installed on a trailer frame, according to an embodiment of the invention;

DETAILED DESCRIPTION

Figure 5:
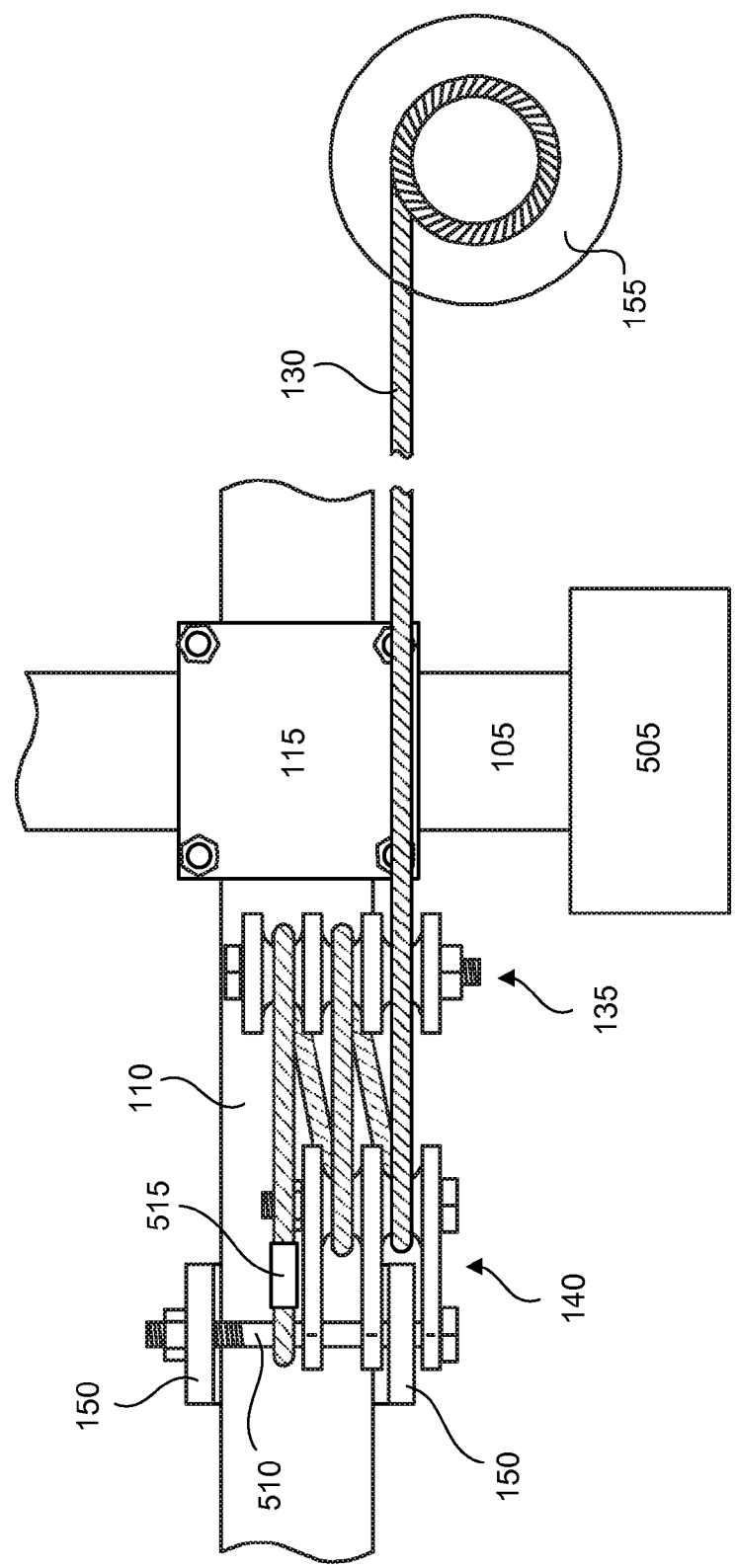
FIG. 5 is a plan view of an axle lift system installed on a trailer frame, according to an embodiment of the invention.

Embodiments of the invention now will be described more fully with reference to FIGS. 1 to 10, in which embodiments of the invention are shown. This invention may, however, be embodied in many different forms and should not be construed as limited to the embodiments set forth herein.

Lift Apparatus

FIG. 1 is an elevation view of an axle lift system installed on a trailer frame, according to an embodiment of the invention. As shown therein, leaf springs 110 are coupled to a frame 165 of a double axle trailer. In the illustrated embodiment, the leaf springs 110 are secured above the axles 105 by u-bolt assemblies 115. The leaf springs 110 are coupled to each other via shackle straps 125 and equalizer 120. A spring bracket 150 is connected to a portion of a leaf spring 110 adjacent to an axle 105. The spring bracket 150 is coupled to the frame 165 via a block and tackle lift apparatus that includes winch 155, cable 130, fixed block 135, and moving block 140. The fixed block 135 is connected to the frame 165 via anchor mounting bracket 145. The lift apparatus will be further described with reference to FIG. 5 below. FIG. 1 also illustrates an electrical connection box 160 to facilitate electrical connections to the winch 155. The spring bracket 150, winch 155, cable 130, fixed block 135, and moving block 140 are all components of an axle lift system.

In an axle-lifting mode, the winch 155 retracts (winds) the cable 130, causing the axle 105 that is adjacent to the spring bracket 150 to rise. In an axle-lowering mode, the winch 155 releases (unwinds) the cable 130 and the force of the associated leaf spring 105 causes the axle to return to its normal operating position.

Variations to the configuration illustrated in FIG. 1 are possible. For example, in an alternative embodiment, the spring bracket 150 could be replaced with an axle bracket configured to couple directly to the axle 105 casing. The location of the anchor mounting bracket 145 with respect to the corresponding axle 105 could be varied, according to design choice. Other variations are described below with reference to FIGS. 2-4.

FIG. 2 is an elevation view of an axle lift system installed on a trailer frame, according to an embodiment of the invention. FIG. 2 illustrates that, in an alternative embodiment, the leaf springs 110 may be secured below the axles 105 by the u-bolt assemblies 115.

FIG. 3 is an elevation view of two axle lift systems installed on a trailer frame, according to an embodiment of the invention. FIG. 3 illustrates that, in an alternative embodiment, the leaf springs 110 are secured above the axles 105, and axle lift systems are installed on each of the two axles 105. FIG. 4 is an elevation view of two axle lift systems installed on a trailer frame, according to an embodiment of the invention. FIG. 4 illustrates that, in an alternative embodiment, the leaf springs 110 are secured below the axles 105, and axle lift systems are installed on each of the two axles 105.

Although the elevation views in FIGS. 1-4 only illustrate a portion of one side of a trailer, it should be appreciated that the non-illustrated side of the double axle trailer could include an axle lift system on or adjacent to one or both axles. Preferably, a double axle trailer is configured with four axle lift systems, one associated with each trailer wheel.

FIG. 5 is a plan view of an axle lift system installed on a trailer frame, according to an embodiment of the invention. Some components, for example the anchor mounting plate 145 and frame 165, are omitted for clarity. In the illustrated embodiment, the leaf spring 110 is secured above the axle 105. FIG. 5 shows the relative positioning of a wheel hub 505 on the axle 105. As shown, the fixed block 135 includes three pulleys; the moving block 140 includes two pulleys. An end of cable 130 is looped around bolt 510 and terminated with cable clamp 515. In alternative embodiments, the fixed block 135 and moving block 140 could each include a fewer or greater number of pulleys.

Controls

Figure 6:
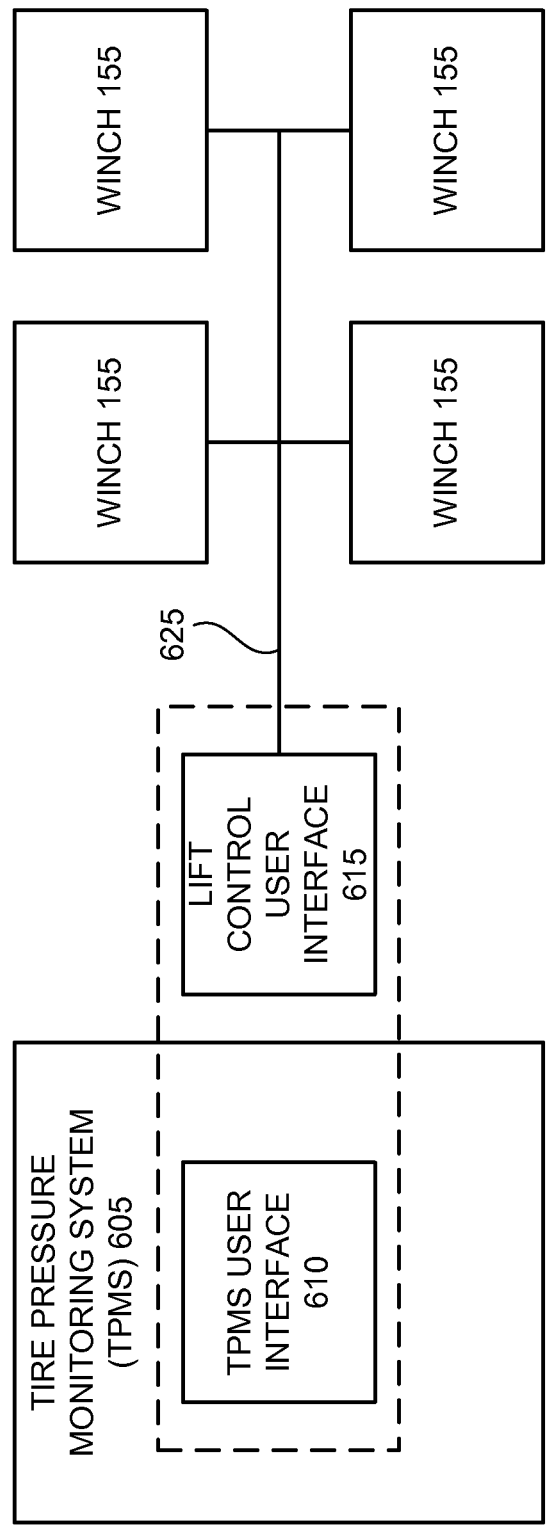
FIG. 6 is a functional block diagram of a monitoring and control assembly for an axle lift system, according to an embodiment of the invention.

FIG. 6 is a functional block diagram of a monitoring and control assembly for an axle lift system, according to an embodiment of the invention. In the illustrated embodiment, a Tire Pressure Monitoring System (TPMS) 605 includes a TPMS user interface 610. The TPMS 605 may be a direct type (relying on the use of pressure sensors inside or outside of each tire) or an indirect type (estimating pressure, for example, based on wheel speed, acoustic signature, or other factors). The TPMS user interface 610 may output an audible or visual alert, for instance, when the measured or estimated tired pressure within a pneumatic tire falls below a predetermined threshold. Alternatively, or in combination, the TPMS user interface 610 may display a measured or estimated tire pressure value for each tire being monitored.

As also illustrated in FIG. 6, a lift control user interface 615 is coupled to each of four winches 155 via a link 625. The lift control user interface 615 is configured so that an operator can independently control each of the winches 155 (preferably in either direction) by manually inputting a control signal. The link 625 could be or include a cable assembly and/or a wireless communication link.

Preferably, elements of the TPMS user interface 610 and lift control user interface 615 are integrated, spatially and/or via software, as will be described below with reference to FIGS. 9 and 10. Preferably, the TPMS user interface 610 and/or lift control user interface 615 are remotely located, for example at an operator's station in a tow vehicle or at one end of a trailer on which one or more axle lift systems are installed.

Variations to the configuration illustrated in FIG. 6 are possible. For example, the number of winches 155 can vary according to application needs (but 4 winches 155 are preferred for a double-axle trailer, and 6 winches 155 are preferred for a triple-axle trailer). In an alternative embodiment of the invention, the TPMS 605 automatically outputs a lift control signal to a selected one of the winches 155 based on a measured or estimated low-pressure condition, preferably in addition to an audible and/or visual warning to the operator.

Figure 7:
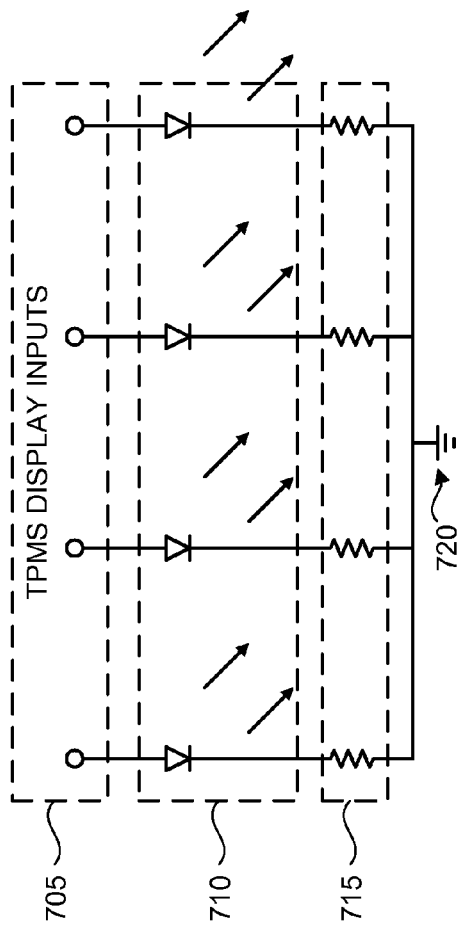
FIG. 7 is a schematic diagram of a light-emitting diode (LED) module of a tire pressure monitoring system, according to an embodiment of the invention.

FIG. 7 is a schematic diagram of a light-emitting diode (LED) module of a tire pressure monitoring system, according to an embodiment of the invention. The illustrated schematic describes one embodiment of the TPMS user interface 610. As shown therein, a logical high signal received at any TPMS display input 705 will illuminate a corresponding LED 710. Each of the LEDs 710 is connected to ground 720 via a corresponding series-coupled current-limiting resistor 715.

Figure 8:
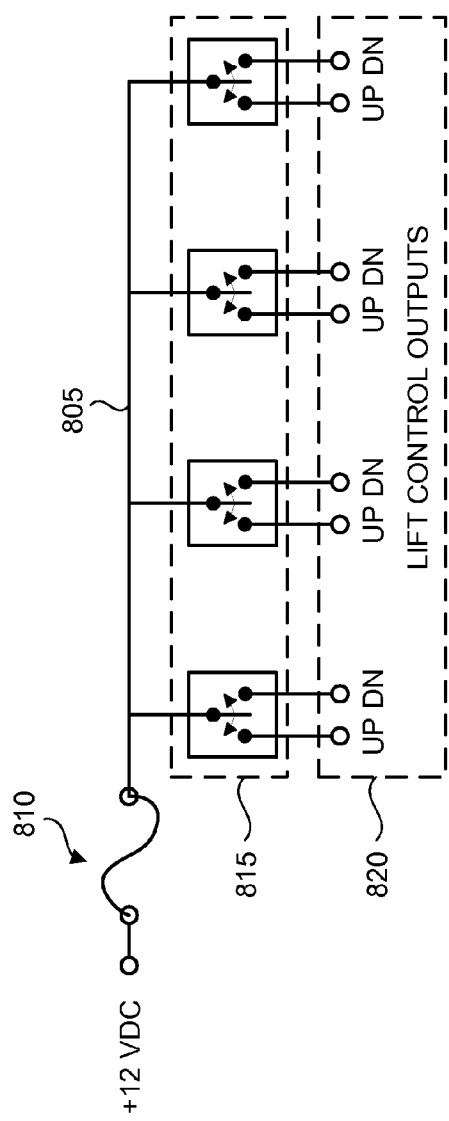
FIG. 8 is a schematic diagram of a lift control user interface, according to an embodiment of the invention.

FIG. 8 is a schematic diagram of a lift control user interface, according to an embodiment of the invention. The illustrated schematic describes one embodiment of the lift control user interface 615. As shown therein, a +12 VDC source supplies a VCC buss 805 via a series-coupled fuse 810. Each of the switches 815 (preferably rocker switches) is configured to output an up (UP) or down (DN) lift control output signal 820 to a corresponding winch 155 based on operator input.

Figure 9:
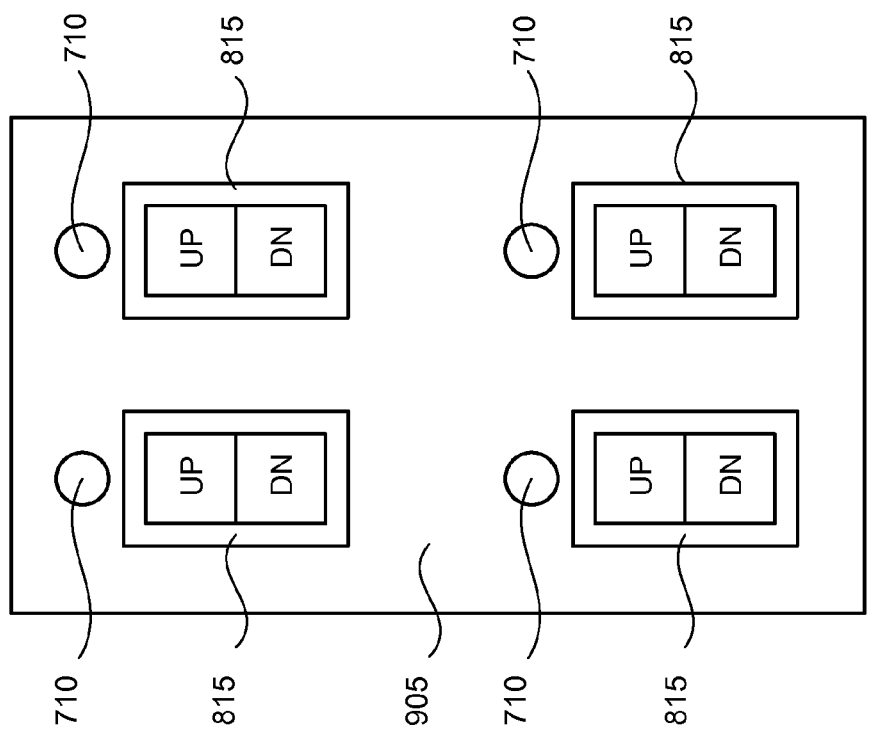
FIG. 9 is a layout of a user interface panel, according to an embodiment of the invention.

FIG. 9 is a layout of a user interface panel, according to an embodiment of the invention. The configuration in FIG. 9 is an example of a spatially-integrated TPMS user interface 610 and lift control user interface 615. As shown therein, each of 4 LED's 710 are mounted on a panel 905 adjacent to a corresponding switch 815.

In operation, the TPMS 605 illuminates a selected one of the LED's 710 based on a measured or estimated low pressure tire condition. An operator would then preferably stop the vehicle and depress a corresponding switch 815 in the up (UP) direction to activate a corresponding winch 155 and raise the axle 105 associated with the flat tire. After the flat tire is repaired or replaced, the operator would depress the corresponding switch in the down (DN) direction to cause the corresponding winch 155 to release its cable and lower the axle 105 associated with the repaired or replaced tire to its normal operating position.

Figure 10:
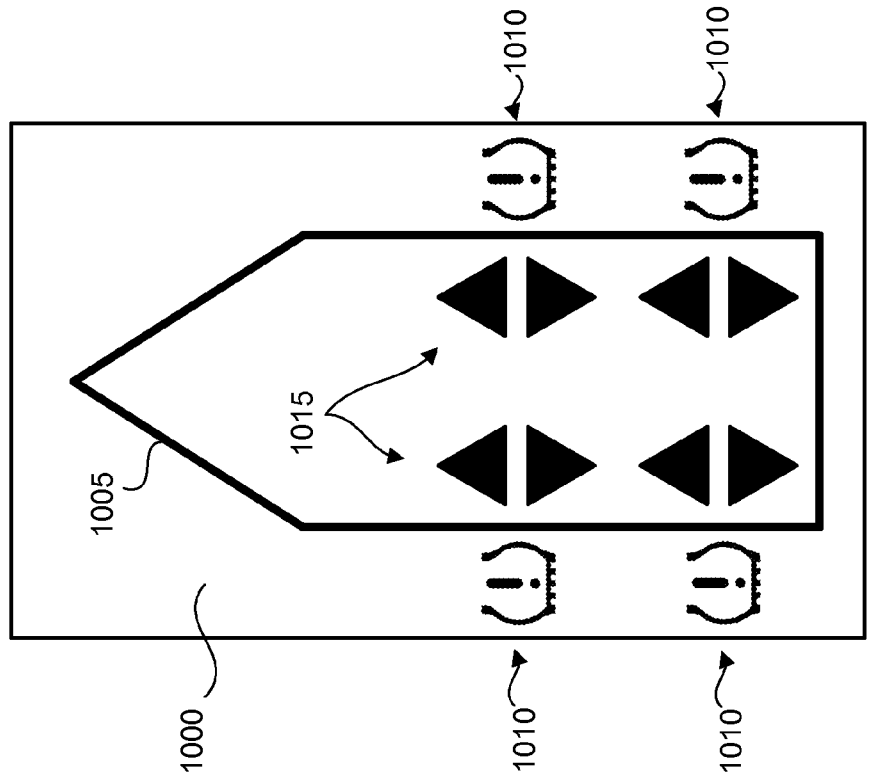
FIG. 10 is an illustration of a graphical user interface, according to an embodiment of the invention.

FIG. 10 is an illustration of a graphical user interface, according to an embodiment of the invention. The configuration in FIG. 10 is an example of a software-integrated TPMS user interface 610 and lift control user interface 615. As shown therein, an input/output device 1000 (an electronic display) is configured to display trailer icon 1005, low pressure warning icons 1010, and winch control buttons 1015. As used herein, an electronic display may be configured to receive user inputs, for example via touch screen techniques.

In operation, the TPMS 605 would cause a selected one of the low pressure warning icons 1010 to illuminate, change colors, flash, or otherwise alert the operator based on a measured or estimated low-pressure tire condition. An operator would then preferably stop the vehicle and depress a corresponding winch control button 1015 on the electronic display 1000 to activate a corresponding winch 155 and raise the axle 105 associated with the flat tire. After the flat tire is repaired or replaced, the operator would depress the corresponding winch control button 1015 to cause the corresponding winch 155 to release its cable and lower the axle 105 associated with the repaired or replaced tire to its normal operating position.

Although the embodiments described above with reference to FIGS. 6-10 are for a 4-winch configuration, any monitoring or control functions could be easily scaled to any number of axle lift systems, according to application requirements.

CONCLUSION

Embodiments of the invention thus enable an operator to easily identify and/or lift an axle associated with a trailer tire that is flat or excessively low on pressure. On a multi-axle trailer, such a system facilitates an emergency tire change and may enable an operator to tow the trailer to a service station or other safe location.

It will be apparent to those skilled in the art that modifications and variations can be made without deviating from the spirit or scope of the invention. For example, the monitoring and control features described with reference to FIGS. 6-10 are not necessarily required. The TPMS 605 could be omitted entirely. Each winch 155 could be operated via a corresponding switch that is co-located on the trailer (for example in the electrical connection box 160).

I claim:

1. An axle lift system for a trailer comprising:
   a moving block coupled to an axle of the trailer, the moving block including at least two pulleys;
   a fixed block coupled to a frame of the trailer;
   a winch; and
   a cable, the cable communicating with the moving block, the fixed block, and the winch, the axle lift system configured to move the axle upon operation of the winch.

2. The axle lift system of claim 1, wherein the fixed block includes three pulleys, and five sections of the cable are disposed between the moving block and the fixed block to support the axle during operation of the winch.

3. The axle lift system of claim 1, further comprising a leaf spring bracket connected to the moving block and coupled to the axle.

4. The axle lift system of claim 1, further comprising an axle bracket connected to the moving block and coupled to the axle.

5. The axle lift system of claim 1, further comprising a user interface including:
   an output device configured to indicate a pressure condition of a tire on the trailer to a user; and
   a user input device proximate to the output device, the user input device coupled to the winch.

6. The axle lift system of claim 5, wherein the output device includes a light-emitting diode (LED) to indicate a low tire pressure condition.

7. The axle lift system of claim 5, wherein the output device includes a low tire pressure warning icon on an electronic display.

8. The axle lift system of claim 5, wherein the output device is configured to produce an audible alert.

9. The axle lift system of claim 5, wherein the user input device includes a hardware switch coupled to the winch.

10. The axle lift system of claim 5, wherein the user input device includes at least one button on an electronic display.

11. The axle lift system of claim 10, wherein the at least one button includes a first button to raise the axle and a second button to lower the axle.

12. The axle lift system of claim 5, wherein the user input device is coupled to the winch via a wireless communication link.

13. The axle lift system of claim 5, wherein the user interface includes a trailer icon on an electronic display.

14. The axle lift system of claim 5, further including a tire pressure sensor coupled to the output device.

15. The axle lift system of claim 1, further comprising:
   a tire pressure monitoring system; and
   a winch controller coupled to the tire pressure monitoring system and the winch.

16. The axle lift system of claim 15, wherein the tire pressure monitoring system is configured to automatically output a lift control signal to the winch controller based on a low tire pressure condition.

17. An axle lift system for a trailer comprising:
   a moving block coupled to an axle of the trailer, the moving block including at least two pulleys;
   a fixed block coupled to a frame of the trailer;
   a winch;
   a cable, the cable communicating with the moving block, the fixed block, and the winch, the axle lift system configured to raise the axle upon operation of the winch; and
   means for controlling the winch coupled to the winch.

18. The axle lift system of claim 17, further comprising means for monitoring pressure of at least one tire on the trailer.

19. The axle lift system of claim 18, wherein the means for monitoring pressure is configured to automatically output a lift control signal to the means for controlling the winch based on a low tire pressure condition.

* * * * *